(12) United States Patent
Thomas et al.

(10) Patent No.: US 6,684,443 B2
(45) Date of Patent: Feb. 3, 2004

(54) MULTIPLE-DOOR ACCESS BOARDING BRIDGE

(75) Inventors: Michael A. Thomas, Kenilworth, IL (US); Moshe Schechter, Buffalo Grove, IL (US)

(73) Assignee: United Air Lines, Inc., Chicago, IL (US)

(*) Notice: Subject to any disclaimer, the term of this patent is extended or adjusted under 35 U.S.C. 154(b) by 31 days.

(21) Appl. No.: 09/778,416

(22) Filed: Feb. 7, 2001

(65) Prior Publication Data

US 2002/0104176 A1 Aug. 8, 2002

(51) Int. Cl.[7] .......................... E01D 18/00; G01D 19/00
(52) U.S. Cl. .................................... 14/71.5; 14/69.5
(58) Field of Search ............................... 14/71.1, 71.3, 14/71.5, 71.7

(56) References Cited

U.S. PATENT DOCUMENTS

| | | | | |
|---|---|---|---|---|
| 2,487,613 A | | 11/1949 | Stone ........................... 244/114 |
| 3,391,416 A | * | 7/1968 | Riggles, Jr. ................... 14/71.1 |
| 3,524,207 A | * | 8/1970 | Giarretto ...................... 14/71.5 |
| 3,538,529 A | * | 11/1970 | Breier .......................... 14/71.5 |
| 3,711,881 A | * | 1/1973 | Chapman et al. ............... 17/71 |
| 3,728,754 A | * | 4/1973 | Lodjic ........................... 14/71 |
| 3,916,588 A | * | 11/1975 | Magill ........................... 52/30 |
| 4,011,615 A | | 3/1977 | Maxson et al. ............... 14/71.1 |
| 4,110,859 A | | 9/1978 | Lichti ........................... 14/71.5 |
| 4,161,049 A | | 7/1979 | Saunders et al. ............. 14/71.5 |
| 4,222,140 A | | 9/1980 | Olewinski et al. ............ 14/71.3 |
| 4,302,050 A | | 11/1981 | Jones |
| 4,319,376 A | * | 3/1982 | Saunders ..................... 14/71.5 |
| 4,343,379 A | | 8/1982 | Haulotte ....................... 187/18 |
| 4,511,110 A | | 4/1985 | Möller ......................... 248/421 |
| 4,559,660 A | | 12/1985 | Lichti ........................... 14/71.5 |
| 4,712,339 A | * | 12/1987 | Wenham et al. ............... 52/173 |
| 4,724,930 A | | 2/1988 | VanLierop ................. 187/8.43 |
| 4,817,223 A | | 4/1989 | Koch ........................... 14/71.1 |
| 4,852,197 A | | 8/1989 | Thomas, Jr. .................. 14/71.5 |
| 5,105,495 A | * | 4/1992 | Larson et al. ................. 14/71.5 |
| 5,226,204 A | | 7/1993 | Schoenberger et al. ...... 14/69.5 |
| 5,257,431 A | | 11/1993 | Larson et al. ................. 14/71.5 |
| 5,481,773 A | | 1/1996 | Alten ........................... 14/69.5 |
| 5,603,343 A | * | 2/1997 | Larson ......................... 135/131 |
| 5,636,967 A | | 6/1997 | Green et al. ............. 414/793.4 |
| D386,263 S | | 11/1997 | Anderberg ..................... D25/3 |
| 5,704,086 A | | 1/1998 | Hansen et al. ................ 14/71.5 |
| 5,761,757 A | | 6/1998 | Mitchell et al. .............. 14/71.5 |
| 5,791,003 A | | 8/1998 | Streeter et al. ............... 14/71.5 |
| 5,853,150 A | | 12/1998 | Kuchenbrod .............. 244/137.2 |
| 5,855,035 A | | 1/1999 | Streeter et al. ............... 14/71.5 |
| 6,055,692 A | | 5/2000 | Pell et al. ..................... 14/71.5 |
| 6,122,789 A | | 9/2000 | Stephenson et al. .......... 14/71.5 |
| 6,487,743 B1 | * | 12/2002 | Nicoletti ...................... 14/71.5 |
| 6,526,615 B1 | * | 3/2003 | Hutton et al. ................. 14/71.5 |

FOREIGN PATENT DOCUMENTS

DE WO 00/55040 * 9/2000 ........... B64F/1/305

OTHER PUBLICATIONS

FMT Dual Boarding Bridge Shortens Turnaround Times for Aircraft http://www.fmt.se/airport/index.htm, site visited Jan. 17, 2001.

* cited by examiner

Primary Examiner—Thomas B. Will
Assistant Examiner—Raymond W Addie
(74) Attorney, Agent, or Firm—Brinks Hofer Gilson & Lione

(57) ABSTRACT

An aircraft boarding bridge has two arms, one arm for each side of the aircraft. Using the boarding bridge, passengers and crew may embark or debark both sides of the aircraft at the same time, enabling boarding or deplaning in as little as half the time presently used. This multiple-door access boarding bridge may use one or more than one door on each side of the aircraft. The bridge itself may be an apron-drive model, using drive wheels to approach a parked aircraft, or may be a fixed-location model, using vertical lifts to move into position once an aircraft has parked. Access doors in the bridge allow service personnel to approach without interfering with the boarding or deplaning processes.

29 Claims, 8 Drawing Sheets

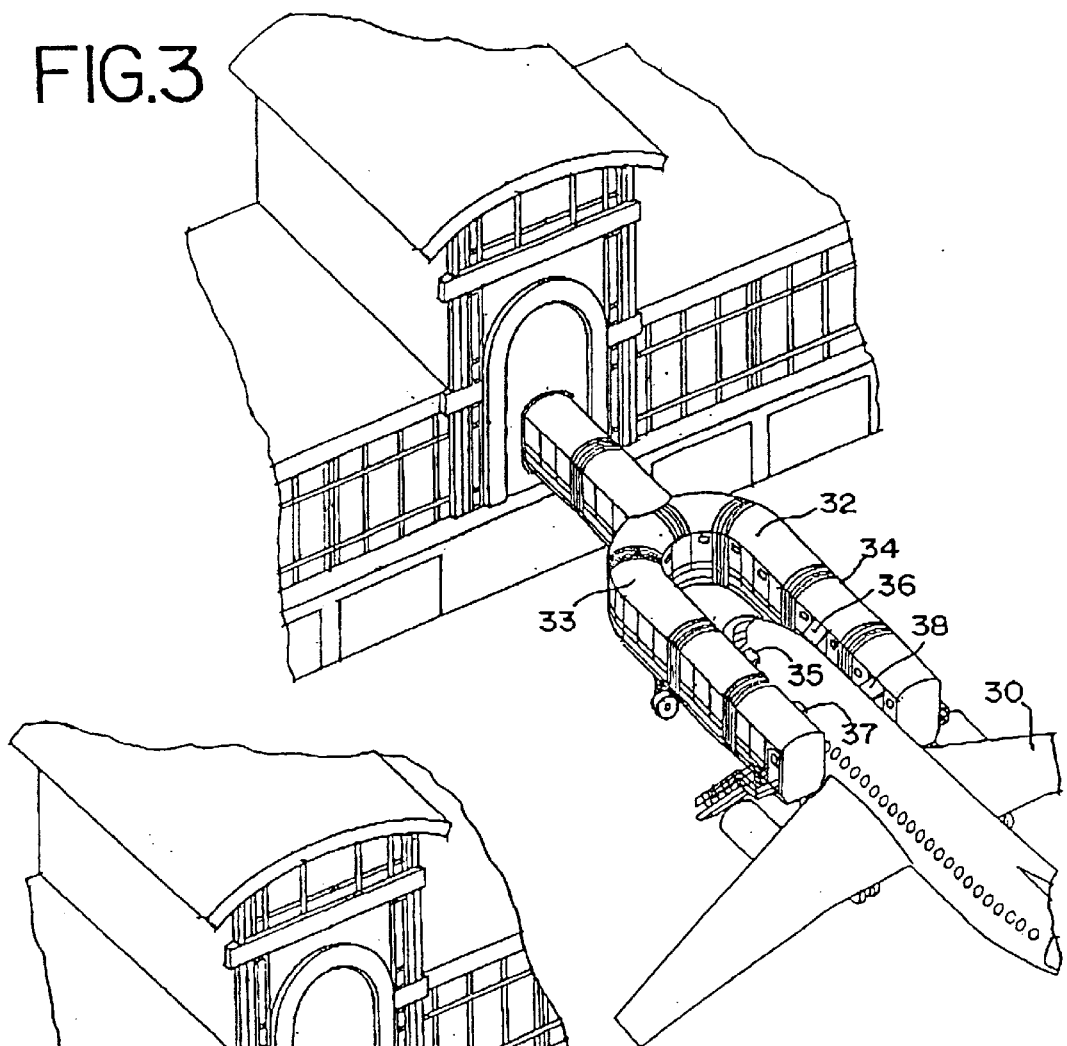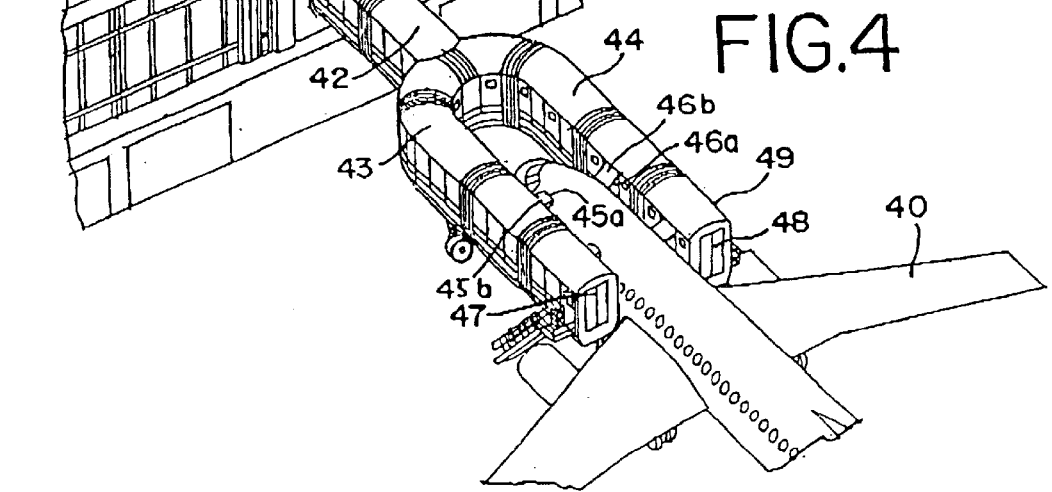

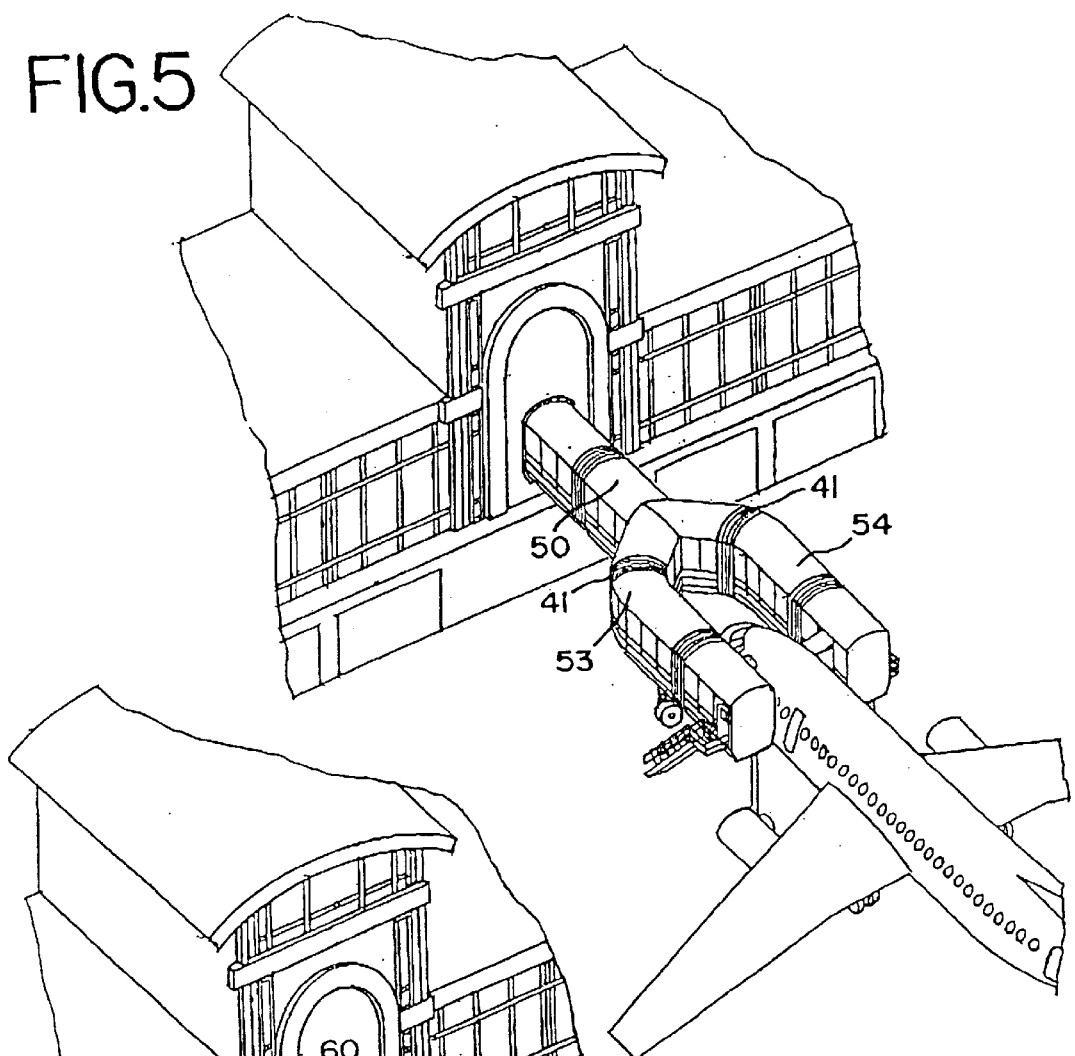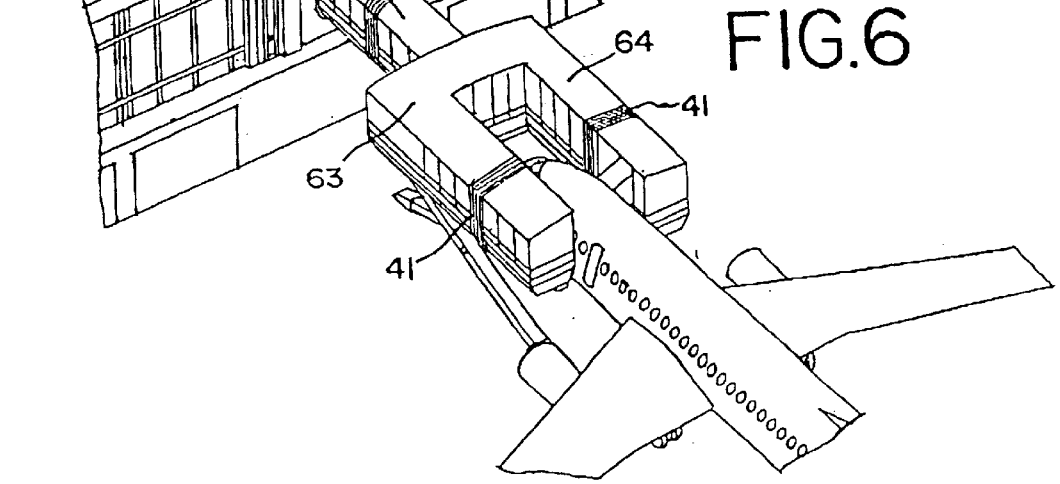

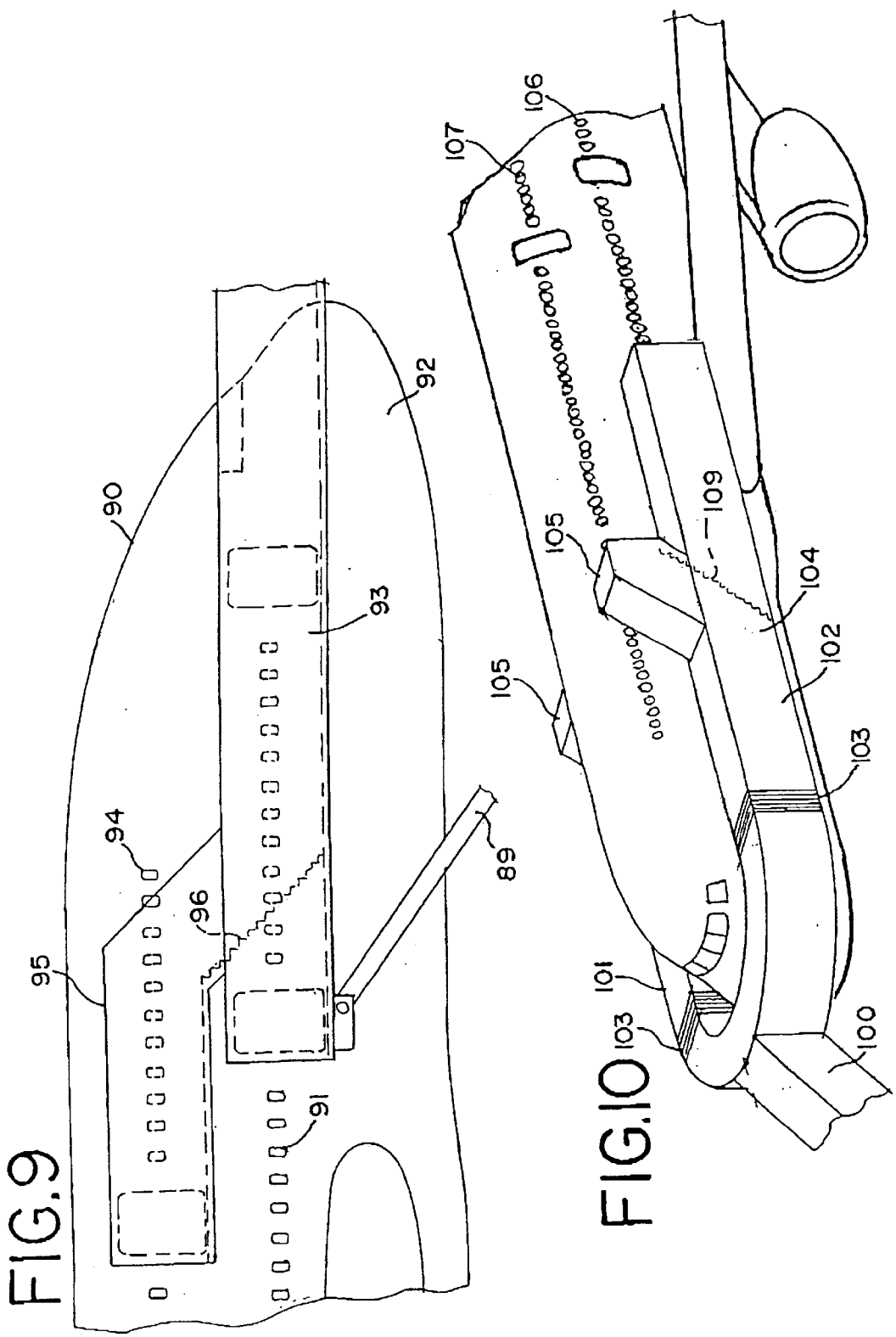

MULTIPLE-DOOR ACCESS BOARDING BRIDGE

BACKGROUND OF THE INVENTION

Air travel has grown ever more popular since the introduction of jet-powered aircraft, making widespread and frequent travel available for both business and pleasure travelers. To take advantage of these trends, aircraft manufacturers have continually enlarged aircraft, to the point where jumbo-jets may now carry 500 passengers, and ultra-high capacity aircraft to carry 700 or 800 passengers are proposed.

It can take a significant amount of time to board so many passengers, delaying departures of aircraft and imposing on the busy schedules of passengers by forcing the passengers to arrive at the gate much earlier than necessary. Upon landing, the process is reversed, but may still take a significant amount of time. The passengers are delayed from going on their way, and the aircraft cannot be cleaned, maintained or moved while deplaning is in progress.

Boarding bridges are typically used to board and disembark passengers on modern aircraft. Boarding bridges are needed both for vertical and horizontal movement of passengers: vertical because aircraft doors are many feet above ramp level, and horizontal because aircraft must be parked at a safe distance from any buildings or other obstructions. Passenger boarding bridges are desirable because they permit passengers and airline personnel to walk or otherwise traverse the distance between the gate of an airport terminal and a parked aircraft with ease. They eliminate the need to climb stairs outside, and provide relative comfort to boarding passengers by protecting them from extreme temperatures, wind, rain, snow or ice. However, such boarding bridges also limit the ingress to and egress from the aircraft, because of their necessarily limited access to the aircraft through a single aircraft doorway.

What is needed is a way to quickly emplane and deplane passengers from an aircraft, preferably via a boarding bridge for their comfort, so that the actual time spent in these processes is kept to a minimum. What is needed is a boarding bridge to quickly emplane and deplane passengers, so that aircraft downtime is kept to a minimum.

BRIEF SUMMARY OF THE INVENTION

The invention is a passenger boarding bridge that will allow aircraft to emplane and deplane passengers from both the left side and the right side of an aircraft simultaneously. One embodiment of the invention is a boarding bridge for an aircraft, the bridge having a passageway extending from a sheltered passenger gate area, and having two arms extending from the passageway, one arm approaching a passenger door on the left side of an aircraft, and the other arm approaching a passenger door on the right side of the aircraft. Passengers may board the aircraft from opposite sides simultaneously via the two arms of the passageway. Upon completion of a trip, the passengers may deplane through the same two doors via a multiple-door access boarding bridge at their destination airport. Embodiments are not limited to two doors, such as one door on the left side of the aircraft and the other on the right side, but rather embodiments may include more than one door on each side of the aircraft, such as two doors on the left and one or two doors on the right side, and so on.

Another aspect of the invention is a method of emplaning and deplaning aircraft passengers, the method comprising providing an aircraft with at least one door on the left side and at least one door on the right side. The method further includes translating or moving a multiple-door access boarding bridge into close proximity with the appropriate doors on the aircraft, opening the doors on the aircraft, and emplaning or deplaning passengers simultaneously from the left side and the right side of the aircraft via the multiple-door access boarding bridge. The invention may have great applicability to wide-body aircraft, such as 747's, 777's, 767's and A340s. It is not limited to widebody aircraft, however, and may be used to more quickly board or deplane passengers on all types of aircraft.

Further aspects of the invention will be apparent from the drawings and description of the preferred embodiments detailed below.

BRIEF DESCRIPTION OF SEVERAL VIEWS OF THE DRAWINGS

FIGS. 3–6 are alternate perspective views of boarding bridges according to the present invention.

FIGS. 9 and 10 are respectively side and perspective views of embodiments of a multiple-door access boarding bridge suitable for widebody aircraft with two levels of seating.

DETAILED DESCRIPTION OF THE INVENTION

Figure 1:
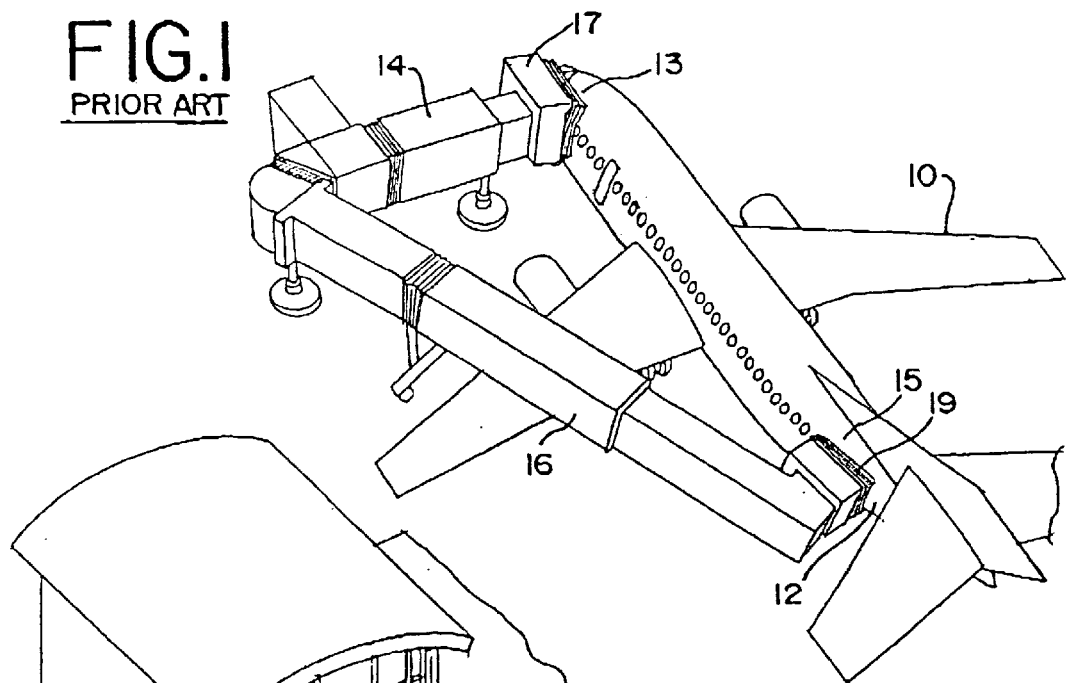
FIG. 1 is a perspective view of a prior art multiple-door access boarding bridge.

FIG. 1 is a perspective view of an aircraft engaged with a prior art boarding bridge. Aircraft 10 having a left side 12 is approached via boarding bridge 14 upon parking at an aircraft gate. The aircraft has two doors 13, 15 on its left side for embarking and debarking. The boarding bridge has a first access door 17 placed near aircraft door 13 so passengers can comfortably step from the boarding bridge to the aircraft. The boarding bridge also has an extension 16 over the left wing of the aircraft, the extension having a second access door 19 for placement near aircraft door 15 so that passengers may use the door 15 for emplaning and deplaning the aircraft. The particular boarding bridge arrangement may have a distinct disadvantage in several ways, including a long traverse from its parked position, and a horizontal and vertical traverse near the wing of the aircraft. Any interference with the aircraft could damage the aircraft, causing inconvenience to the passengers.

Figure 2:
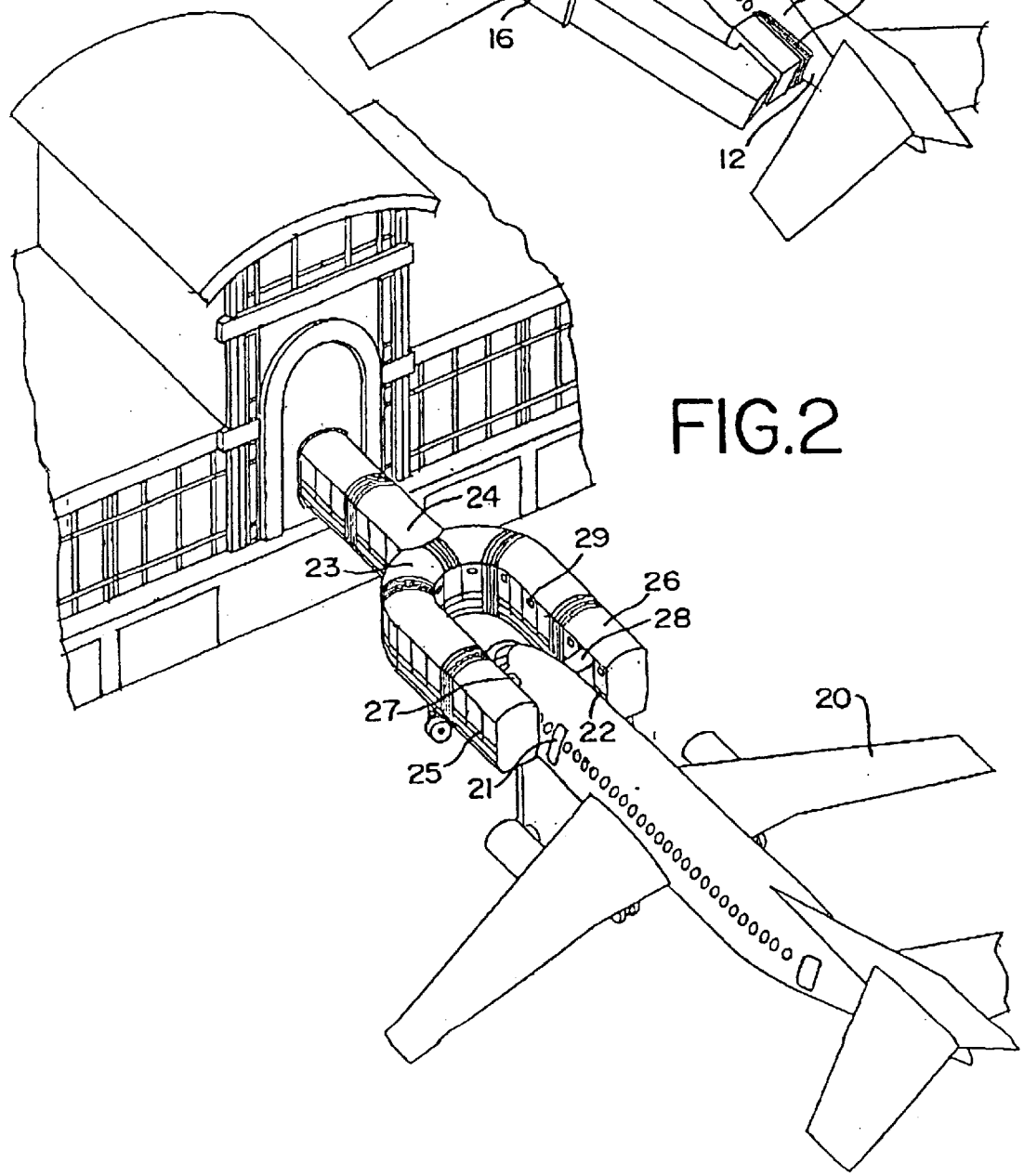
FIG. 2 is perspective view of a multiple-door access boarding bridge according to the present invention.

FIG. 2 depicts an embodiment of the present invention, in which aircraft 20 having a left door 21 and a right door 22 parks near a gate at an airport. A multiple-door access boarding bridge 23 with central passageway 24 approaches the aircraft directly, the passageway having a left arm 25 and a right arm 26, each arm equipped with a door 27, 28 for placement near the corresponding aircraft door 21, 22. The inner side of the boarding bridge, near the aircraft, may be equipped with lighting 29, such as guide lights, to facilitate parking. In this manner, passengers may board the aircraft, or depart the aircraft, independently from the left and right sides of the aircraft, thus saving up to half the time presently used to emplane or deplane passengers. As described below, the length of the arms may be modified to accommodate different door placements on different types of aircraft.

FIG. 3 depicts another embodiment of the invention, in which multiple doors on each side of the aircraft are used for emplaning or deplaning passengers. Aircraft 30 parks at an aircraft gate and is approached by multiple-door access bridge 32, having a left arm 33 and a right arm 34. The left arm has ports or doors 35a, 37a and the right arm has ports or doors 36a, 38a. The boarding bridge approaches the aircraft and places its left arm near the left side of the aircraft so that the boarding bridge left doors are conveniently close to aircraft doors on the left side, so that passengers may conveniently step from one to the other. The right arm of the boarding bridge approaches the right side of the aircraft so that the boarding bridge right side doors are conveniently close to aircraft doors on the right side.

Aircraft are frequently equipped with doors on the right side of the aircraft, but these doors are traditionally used for other purposes, such as servicing the aircraft during turn-arounds. Thus, in some instances, a right-side door is used for replenishment of on-board food and beverage service, as well as laundry and other maintenance-type activity, but the right hand door is not used for passenger boarding. Other embodiments, as shown in FIG. 4, may be designed so as not to interfere with these traditional uses. In FIG. 4, an aircraft 40 has parked and is near boarding bridge central passageway 42 having a left arm 43 and a right arm 44. Aircraft left door 45a is adjacent bridge door 45b and aircraft door 46a is adjacent bridge door 46b, the left doors and right doors used for passengers and crew boarding and debarking. In addition, the left arm has a service door 47 and the right arm has a service door 48 for use by service personnel, for instance, food and beverage service, cleaning services, laundry services, maintenance, and so on. The boarding bridge may also be equipped with features for the purpose of further decreasing the turn-around time for the aircraft. For instance, each arm of the boarding bridge may be equipped with a central vacuuming system 49 for the convenience of maintenance and cleaning personnel. Each arm may also have a provisioning center for storage of cleaning supplies or cleaning equipment, or may also have a refrigeration facility for prior storage of catering or food service carts.

The embodiments used so far have featured primarily a broad "U"-shaped boarding bridge, with the left and right arms forming the "U". Other embodiments may use similar shapes, such as a "Y", as shown in FIG. 5 or what might be described as a squared-off "U" in FIG. 6. In FIG. 5, the access boarding bridge 50 has a left arm 53 and right arm 54 joined by flexible sections 41. The boarding bridge arms meet in what may be described as "Y" intersection, conserving space used for the boarding bridge, and requiring less open area on the tarmac at the gate. FIG. 6 shows an alternate embodiment, in which multiple-door access boarding bridge 60 joins arms 63 and 64 with flexible sections 41. This arrangement requires more space, but also accommodates more passengers in the bridge. The precise shape of the boarding bridge or the transition from the central passageway is not important, but rather its function in enabling the boarding of passengers and crew from both sides of the aircraft at the same time. This simultaneous loading or unloading of the aircraft may save as much as one-half the time presently used, much of which may be considered inefficient, at least in terms of aircraft utilization.

Figure 7:
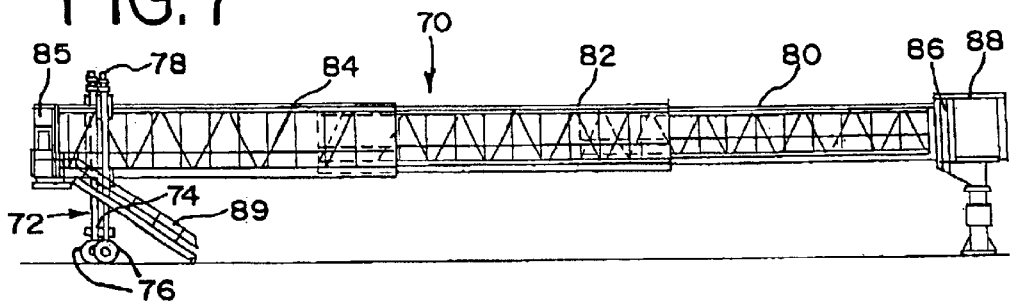
FIG. 7 is a side view of an "apron drive" embodiment of a multiple-door access boarding bridge.
Figure 8:
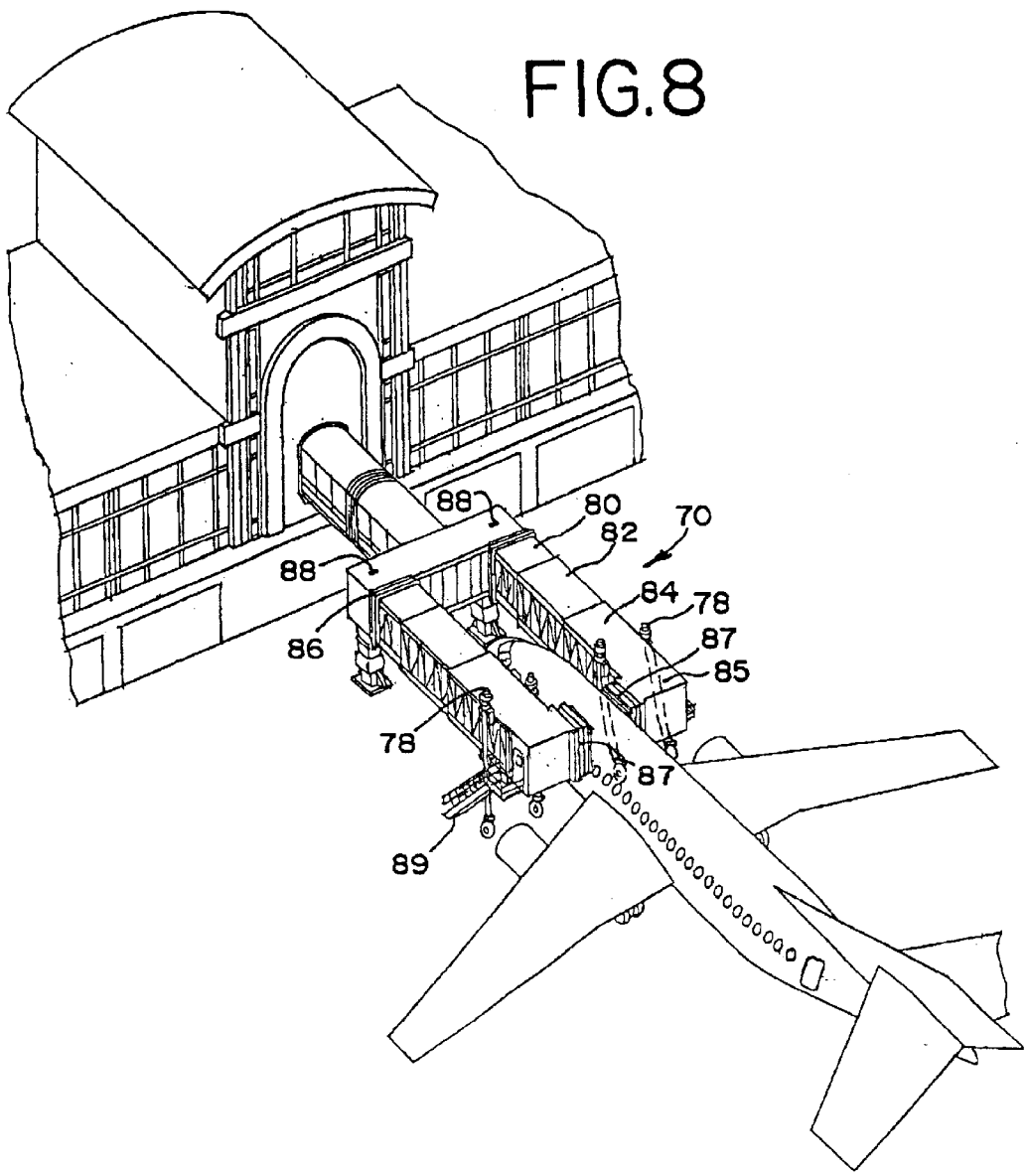
FIG. 8 is a perspective view of an "apron drive" embodiment of a multiple-door access boarding bridge.

In an "apron drive" embodiment, the boarding bridge has two arms, as described above, and is equipped with extensions capable of extending towards the aircraft and drive units, or telescoping mechanisms, to drive the extensible boarding bridge in the direction of the aircraft. FIGS. 7 and 8 are, respectively, side and perspective views of such an embodiment. FIGS. 7 and 8 depict a left arm 70 of a multiple-door access bridge. The left arm comprises at least one drive unit 72 on each side of the arm (opposite side not shown in this view), each drive unit having a vertically-adjustable jack 74 and drive wheels 76. The vertically-adjustable jacks may be powered by a reversible electric motor 78. Driving the drive wheels in the direction of the aircraft causes the arm to extend through its extensions 80, 82 and 84, in which extension 80 fits into extension 82 which in turn fits into extension 84. These embodiments may also have a steering capability, i.e., the drive units may bring the boarding bridge laterally close to the aircraft as well as in a longitudinal direction, using conventional means, such as steerable drive wheels 76.

In this embodiment, arm 70 may extend from junction 86, a point in the boarding bridge at which the two arms of the multiple door access bridge meet. As described in FIGS. 3–6, this junction may be in the general shape of a "U", a "Y" or a squared-off "U", the important point being that there are two arms extending to opposite sides of the aircraft rather than one side only. There may also be a capability for pivoting about a pivot point 88, allowing the arm 70 some degree of freedom. A cab 85 may be provided near the end of the arm from which the travel and extension of the arm is controlled. Cab 85 will also preferably have an ability to extend a short distance perpendicular to the aircraft, through the drive wheels or through an independent mechanism, so that passengers may step comfortably from the aircraft to the boarding bridge, or vice-versa. As shown in FIG. 8, the cab may also preferably have a soft overhang 87 to interface with the outside of the aircraft and protect passengers and crew from inclement weather while boarding. The boarding bridge also desirably includes a ramp or stairs 89 for ground-crew access to the aircraft and for last-minute baggage handling from the passenger section.

The embodiments discussed thus far have in common passengers going to and from an aircraft on a single level, that is, the aircraft, such as Boeing 777 and 767 aircraft, or Airbus A340 aircraft, utilize a single level of passengers on the aircraft. Other aircraft may use more than a single level of passengers, i.e., two or more levels. For instance, the Boeing 747 has a small upper compartment in the foresection seating about 34 passengers. The Airbus A380 plans to utilize two full "floors" or levels of passengers in its seating of 555 or more passengers. Therefore, another embodiment of the invention features not only two arms, but also two levels of emplaning and deplaning capability. FIGS. 9 and 10 depict an embodiment in which a multiple-door access boarding bridge has an arm on the left side and an arm on the right side, and also has arms extending to the second level so as to board and deplane passengers onto the second level. Aircraft 90 has two levels of passengers, a first level 91 and a second level 94 above the first level. First level 91 is served on the right side of the aircraft 92 (as shown) by a first arm 93 of a multiple-door access boarding bridge leading to the first level, and by a second arm 95 leading via a stairway 96 to the second level. In an alternative embodiment, access to the second level may be facilitated by an assisted by escalator rather than a stairway.

FIG. 10 depicts another embodiment in which an aircraft with 2-level passenger seating utilizes a multiple-door access boarding bridge 100. The bridge has a general Y-shape with an arm 101 for passengers boarding the right side of the aircraft, and an arm 102 for passengers boarding the left side of the aircraft. As shown previously, the bridge may include one or more flexible sections 103. This bridge also has a lower level 104 for passengers boarding the aircraft lower level 106 and an upper level 105 for passengers boarding the upper level 107 of the aircraft. An escalator or elevator or stairs 109 may be positioned for aiding passengers to travel to the upper level through the upper level of the boarding bridge.

Figure 11:
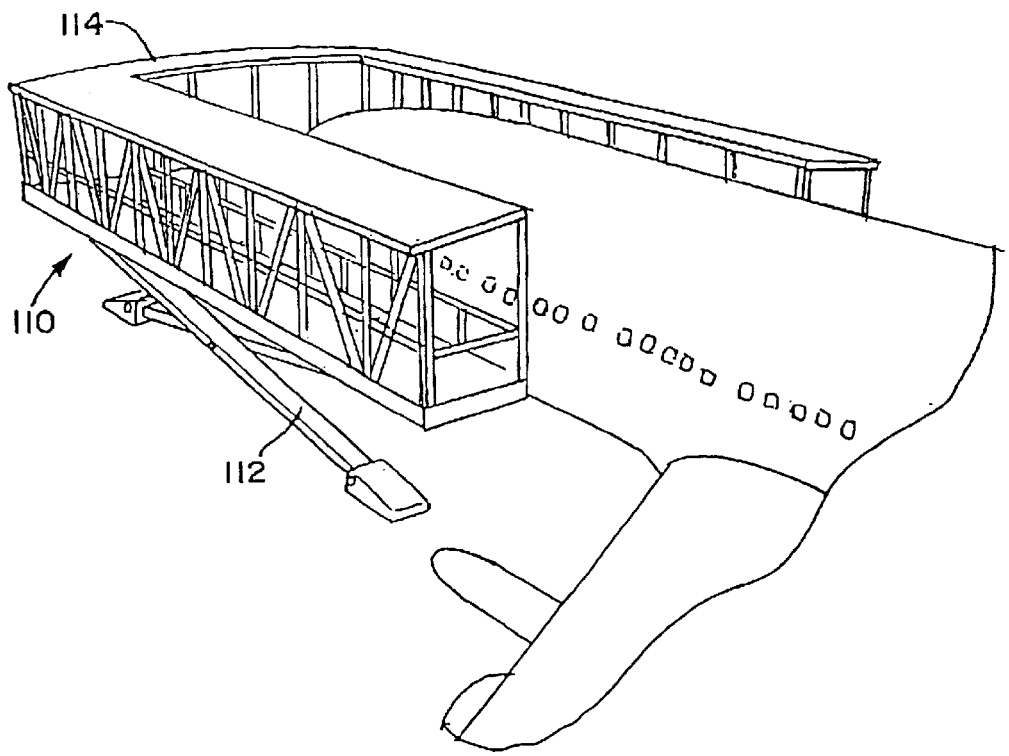
FIG. 11 is a perspective view of a "fixed location" embodiment of a multiple-door access boarding bridge.

The embodiments depicted thus far have in common the fact that they all approach the aircraft once the aircraft has neared the gate and has parked. In addition to these "apron drive" embodiments, another embodiment may feature a fixed location multiple-door access bridge. In the fixed location embodiments, the boarding bridge has a very limited ability to move in a horizontal direction, but instead is at a fixed location, such as near a gate at an airport terminal. This embodiment instead moves vertically to enable boarding and unloading once the aircraft has parked. Such an embodiment is depicted in FIG. 11. Boarding bridge left arm 110 is elevated or lowered via scissor lifting mechanism 112. The arm is connected to the junction 114 of the left and right arms of the boarding bridge, and the junction itself may also be elevated and lowered in tandem with the arms via a hydraulic mechanism (not shown). The fixed location multiple-door access bridges may also have a limited ability to move perpendicular to and approach the aircraft, as illustrated in cabs and soft overhangs of FIGS. 7 and 8.

Figure 12:
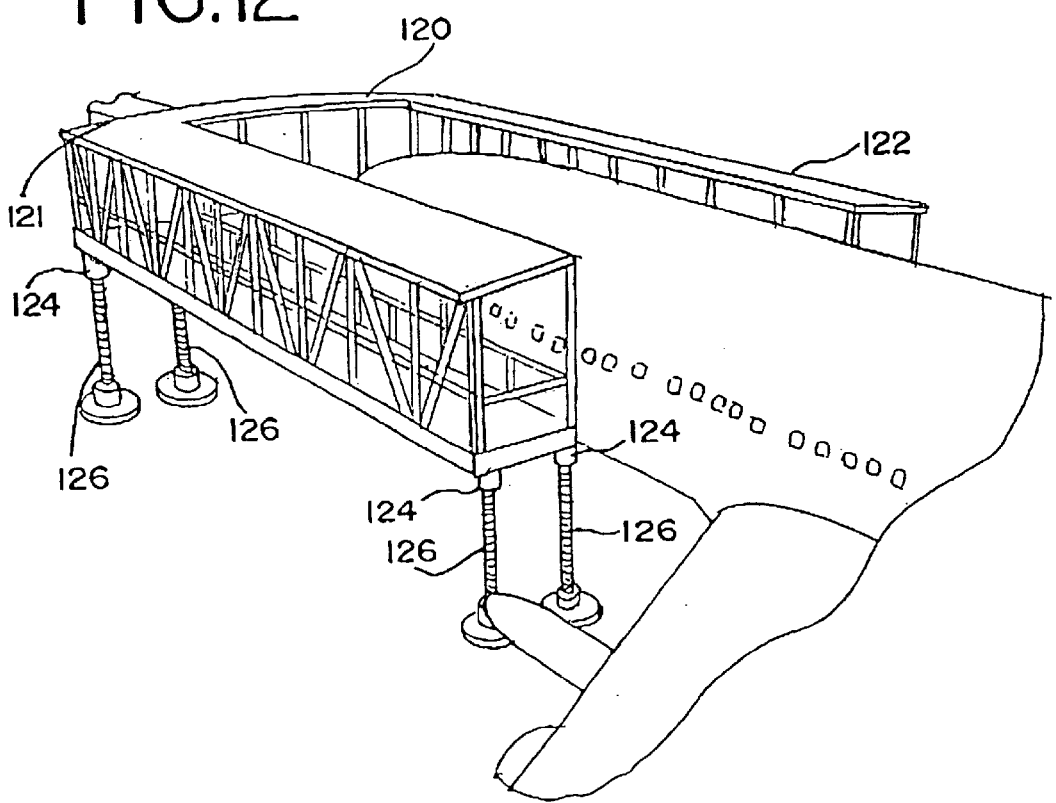
FIG. 12 is a perspective view of a "fixed location" embodiment of a multiple-door access boarding bridge.

The fixed location embodiments have the advantage that they do not travel horizontally near the aircraft, and thus there is no danger of striking or damaging the aircraft during horizontal movement of the boarding bridge. While this embodiment has been shown using a scissors lift with a hydraulic mechanism, it should be understood that the invention is not limited to such an embodiment. Other embodiments may utilize other types of lifts, such as ballscrews, ball-screw jacks, and so on, typically powered by electric motors. FIG. 12 depicts another embodiment of a fixed-location multiple-door access bridge 120, having left arm 121 and right arm 122, and ball-screw lift mechanisms 124 acting on jacks 126 to lift the bridge once the aircraft has parked at the gate.

Figure 13:
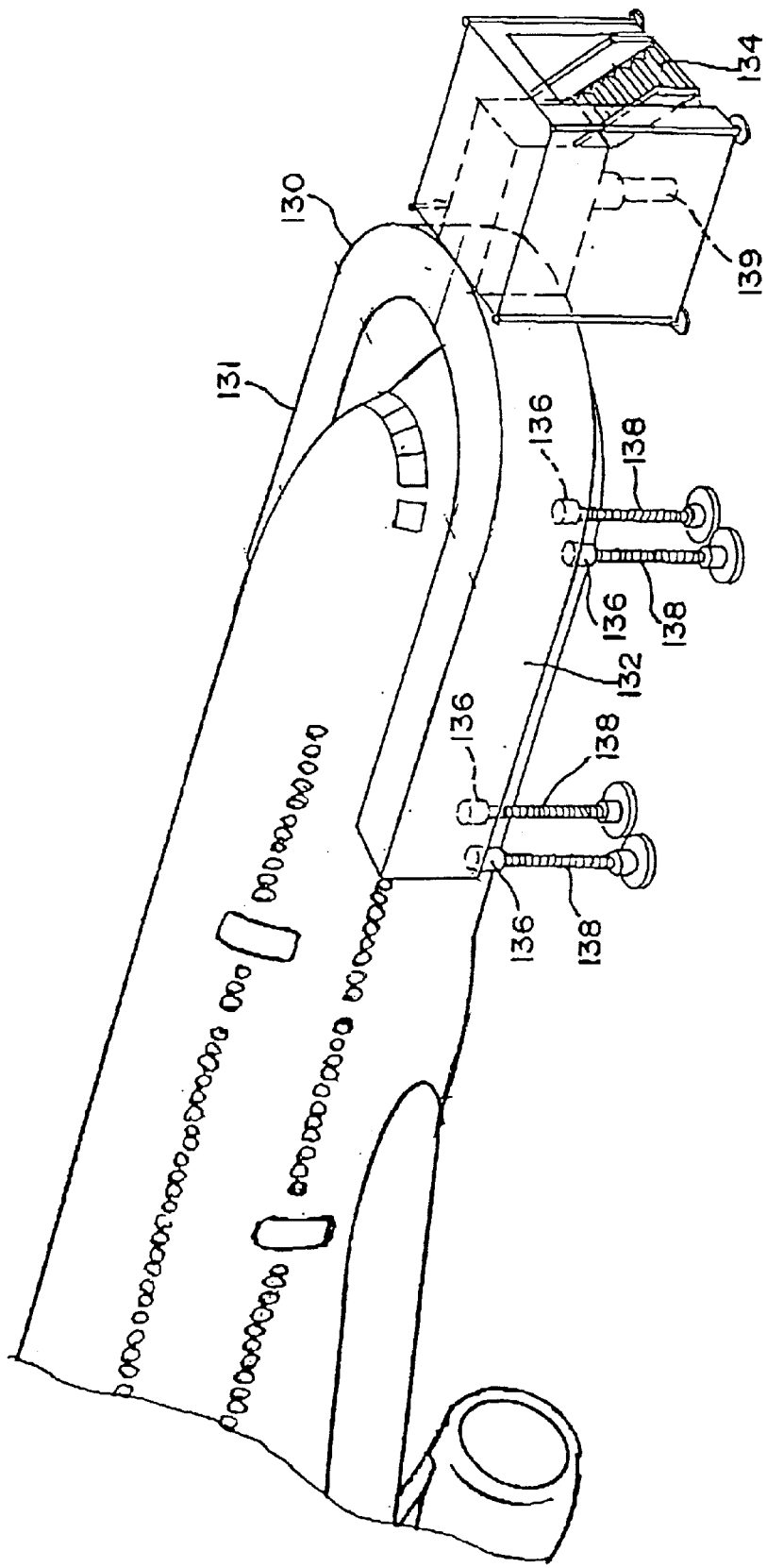
FIG. 13 is a perspective view of a "fixed location" embodiment of a multiple-door access boarding bridge shown with an escalator for easier boarding.

Another feature of the invention also concerns the fixedlocation embodiment. The boarding bridge must move vertically so that the passengers and crew may easily step to and from the aircraft. However, the other end of the bridge, such as an end in an airport terminal or gate, must also be easy and convenient for use, and must bridge both horizontal and vertical gaps to the gate. In the embodiment shown in FIG. 13, this feature may be provided by an escalator as part of the boarding bridge. Aircraft boarding bridge 130 with left arm 131 and right arm 132 has been entered by an aircraft and raised into emplaning/deplaning position by lifting mechanisms 136 on jacks 138. At the gate end of the boarding bridge an escalator 134 provides the remainder of the horizontal and vertical travel required for passengers, crew members, and other personnel to safely and comfortably travel from the gate to the aircraft. Mobile stairs may be used in place of an escalator, but an escalator can facilitate boarding in a speedy and efficient manner. If desired, vertical movement may be provided by one or more hydraulic mechanisms 139.

Figure 14:
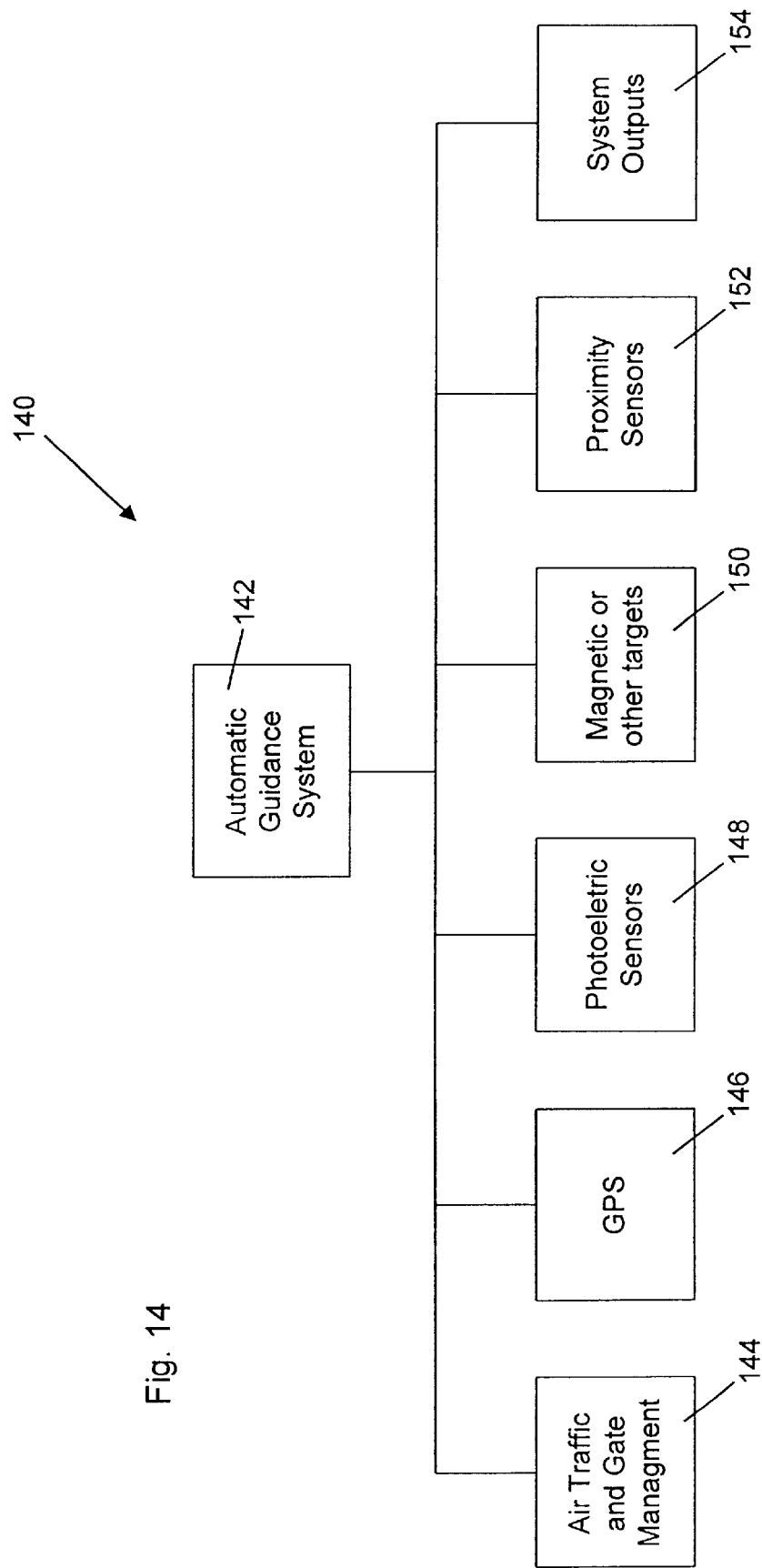
FIG. 14 is a block diagram of a control system for a multiple door boarding bridge.

In another embodiment, the multiple door access boarding bridge includes a control system, so that the separate arms of the bridge can approach and "dock" with the doors of the aircraft. The advantages of the self-guiding boarding bridge may include the cost advantages that accrue from not requiring an operator to guide every motion of the bridge. In one embodiment, the bridge is guided by a computer system, which downloads information to the control system as to the particulars of the aircraft or boarding situation at hand. A control system 140 is depicted in FIG. 14. A computer-aided automatic guidance system 142 receives inputs from a number of sources, including a gate traffic management system, such as an air traffic and gate management system 144, which may inform the computer the type of aircraft next to emplane or deplane passengers. This information should include details such as the expected parking position of the aircraft at the gate, and also information as to the height of the doors, so that the boarding bridge can adjust its height to match the aircraft doors and ease the way for passengers. The computer system ideally will also store information on the desired location for the plane on the tarmac so that the boarding bridge will know generally where to approach the aircraft.

The control system should also include sensors or inputs for feedback as to the actual location of the aircraft and the desired doors. These inputs may include global positioning systems (GPS) 146, photoelectric sensors 148, magnetic or other targets 150 outlining the doors of the aircraft, and proximity, capacitance or other sensors 152. With these devices, the control system is able to determine that the aircraft and the doors are within an acceptable range for automatic positioning, or not. If not, the control system should include manual controls for approaching the aircraft and its doors. Outputs 154 of the control system are commands to the positioning systems used for horizontal or vertical movements. In addition to strictly horizontal or vertical movements, other outputs, such as vectors in x-y space, or x-y-z space may be used, as well as commands in other coordinate systems, such as cylindrical (r, θ, z) or spherical (x, y, r) may also be used.

If the aircraft and the doors are within range, the sensors may be used in order of lesser to greater sensitivity, such as GPS to approach within a few meters of the aircraft, followed by proximity sensors, followed by close range photoelectric sensors for aircraft door approach. In one embodiment, the bridge will approach an aircraft that has come to a complete stop. The bridge will move a short distance, guided by GPS readings on the aircraft and bridge. The arms of the bridge will then close to a certain distance on the fuselage, using proximity sensors. The arms then extend until they are at the aircraft doors, under the guidance of photoelectric sensors. The arms may then make a height adjustment to the doors, which adjustment will vary depending on the actual heights of the bridge and the aircraft (depending on fuel load, number of passengers, etc.). While this description has used certain sensors as examples, many other ways to control an approach may be used, including radar, sonar, laser targeting, and so on. What is important is the automatic approach of the bridge to the aircraft, not the particular technique employed.

While this invention has been shown and described in connection with the preferred embodiments, it is apparent that certain changes and modifications, in addition to those mentioned above, may be made from the basic features of this invention. For example, multiple-door access boarding bridges are most advantageously used with wide-body aircraft seating hundreds of passengers, but they may also be used on narrow body or even smaller aircraft without departing from the invention. Such an application may be suitable if very fast embarkation or exit is desired even in smaller aircraft. It is not strictly necessary to manufacture entirely new boarding bridges, but rather extensions to existing boarding bridges may provide the advantages of the invention. In such an embodiment, an existing boarding bridge could be used, with an extension from a passageway leading to a sheltered passenger gate area to the opposite side of the aircraft (in most cases, to the right side of the aircraft).

Because of the importance of not causing damage to aircraft, it is prudent to use embodiments that incorporate horizontal or vertical movement in their approach to aircraft; however, the invention will work as well if the multiple-door access boarding bridge is fixed in location, both horizontal and vertical, and the aircraft taxis to the bridge or is towed into place. In use with aircraft having two or more seating levels, it is not strictly necessary to provide an escalator or other means to move passengers vertically to the higher level(s). However, if it is desired to speed up emplaning and deplaning passengers and crew, an escalator, or even an elevator or other vertical movement device, will significantly decrease time to board or disembark large numbers of passengers. Accordingly, it is the intention of the applicants to protect all variations and modifications within the valid scope of the present invention. It is intended that the invention be defined by the following claims, including all equivalents.

What is claimed is:

1. A boarding bridge for an aircraft, comprising:
   a passageway extending from a sheltered passenger gate area; and
   a plurality of side arms, at least one of said plurality of side arms further comprising an extension to a second level of the aircraft, the plurality of side arms extending generally parallel to a longitudinal axis of the passageway, wherein passengers board or disembark the aircraft via the side arms simultaneously from at least two doors on opposite sides of the aircraft.

2. The boarding bridge of claim 1, further comprising flexible joints between at least one side arm and the boarding bridge.

3. The boarding bridge of claim 1, wherein the side arms are extensible, and telescope or traverse to and from a side of the aircraft.

4. The boarding bridge of claim 1, wherein the side arms extend from the bridge in a "U" shape, and wherein one arm extends to a door on one side of the aircraft, and the other arm extends to a door on the other side of the aircraft.

5. The boarding bridge of claim 1, wherein the aircraft is received between two of the side arms.

6. The boarding bridge of claim 1, further comprising an escalator or a stairway.

7. The boarding bridge of claim 1, wherein the boarding bridge further comprises means for moving toward the aircraft.

8. The boarding bridge of claim 7, wherein the means for moving comprises drive wheels.

9. The boarding bridge of claim 1, wherein the boarding bridge is fixed in horizontal location and further comprises means for moving vertically.

10. The boarding bridge of claim 9, wherein the means for moving vertically is selected from the group consisting of a hydraulic mechanism, a scissor-lift mechanism, and a ball-screw and jack mechanism.

11. The boarding bridge of claim 1, further comprising a control system for automatically approaching an aircraft.

12. The boarding bridge of claim 1, further comprising at least one sensor for guiding the bridge approaching the aircraft.

13. A method of emplaning and deplaning an aircraft, said method comprising:
   providing an aircraft with at least one door on a left side and at least one door on a right side of the aircraft;
   providing a multiple-door access boarding bridge near the aircraft, the boarding bridge comprising a passageway extending from a passenger gate area and two side arms extending generally parallel to a longitudinal axis of the passageway, at least one of said plurality of side arms further comprising an extension to a second level of the aircraft;
   opening the at least one door on the left side and the at least one door on the right side of the aircraft; and
   emplaning or deplaning passengers simultaneously from the left side and right sides of the aircraft via the boarding bridge.

14. The method of claim 13, further comprising translating the boarding bridge near the aircraft.

15. The method of claim 14, wherein the translating is accomplished by movement selected from the group consisting of horizontal and vertical movement.

16. The method of claim 13, further comprising emplaning or deplaning passengers from more than one seating level.

17. The method of claim 13, further comprising servicing the aircraft through a door provided on the hoarding bridge.

18. The method of claim 13, further comprising approaching the aircraft automatically through a control system.

19. The method of claim 13, further comprising receiving an aircraft between the side arms.

20. A passenger boarding bridge for a wide-body aircraft, comprising:
   a central passageway extending from a sheltered passenger gate area;
   a left arm and a right arm extending from the passageway generally parallel to a longitudinal axis of the passageway;
   a drive mechanism and at least two drive wheels attached to each arm;
   an interface near a far end of each arm for nearing an aircraft door; and
   means for vertical adjustment, said means attached to each arm, wherein passengers board or disembark the aircraft via the arms simultaneously from at least two doors on opposite sides of the aircraft.

21. The boarding bridge of claim 20, wherein each arm comprises at least two sections, said sections joined by flexible joints and propelled by a drive mechanism and drive wheels.

22. The boarding bridge of claim 20, wherein each arm comprises at least two sections, said sections telescoping into one another and propelled by a telescoping mechanism.

23. The boarding bridge of claim 20, wherein the means for vertical adjustment are selected from the group consisting of a hydraulic mechanism, a jack mechanism, and steps.

24. The boarding bridge of claim 20, wherein the aircraft is received between the left and right arms.

25. An aircraft boarding bridge with an extension, comprising:
- a passageway from a sheltered passenger gate area, wherein the passageway comprises a first extension to a door on a first side of an aircraft; and
- a second extension from the passageway, wherein the second extension leads to a door on an opposite side of the aircraft, and wherein the extensions extend generally in a direction of the passageway.

26. The boarding bridge of claim 25, further comprising an arm to a second level on an aircraft, said arm extending from the group consisting of the central passageway and the extension.

27. The boarding bridge of claim 25, further comprising a control system for automatically approaching an aircraft.

28. The boarding bridge of claim 27, further comprising at least one sensor for guiding the bridge approaching the aircraft.

29. The boarding bridge of claim 25, wherein the aircraft is received between the first and second extensions.

* * * * *

UNITED STATES PATENT AND TRADEMARK OFFICE
CERTIFICATE OF CORRECTION

PATENT NO. : 6,684,443 B2
DATED : February 3, 2004
INVENTOR(S) : Michael A. Thomas et al.

It is certified that error appears in the above-identified patent and that said Letters Patent is hereby corrected as shown below:

<u>Column 8,</u>
Line 35, delete "hoarding" and substitute -- boarding -- in its place.

Signed and Sealed this

Fourth Day of January, 2005

JON W. DUDAS
*Director of the United States Patent and Trademark Office*